(12) United States Patent
Hoogland

(10) Patent No.: US 6,990,723 B1
(45) Date of Patent: Jan. 31, 2006

(54) METHOD AND APPARATUS FOR MANUFACTURING PRODUCTS AND PLACING LABELS IN A MOLD

(75) Inventor: Hendrik Antonius Hoogland, Krommenie (NL)

(73) Assignee: Fountain Technologies, B.V., Ijssel (NL)

( * ) Notice: Subject to any disclaimer, the term of this patent is extended or adjusted under 35 U.S.C. 154(b) by 0 days.

(21) Appl. No.: 10/069,026

(22) PCT Filed: Aug. 21, 2000

(86) PCT No.: PCT/NL00/00581

§ 371 (c)(1),
(2), (4) Date: Jun. 13, 2002

(87) PCT Pub. No.: WO01/17744

PCT Pub. Date: Mar. 15, 2001

(30) Foreign Application Priority Data

Aug. 20, 1999 (NL) .................................. 1012869
Aug. 20, 1999 (NL) .................................. 1012870

(51) Int. Cl.
*B23P 17/00* (2006.01)

(52) U.S. Cl. ..................... 29/527.1; 264/153; 264/509; 425/126.1

(58) Field of Classification Search ............... 29/527.1; 264/153, 259, 509, 511; 425/129.1, 509, 425/503, 504, 126.1

See application file for complete search history.

(56) References Cited

U.S. PATENT DOCUMENTS

| | | | | |
|---|---|---|---|---|
| 4,954,070 A | * | 9/1990 | Dunlap | 425/503 |
| 4,983,348 A | * | 1/1991 | Barresi et al. | 264/509 |
| 5,044,922 A | * | 9/1991 | Plenzler et al. | 425/503 |
| 5,198,247 A | * | 3/1993 | Bartimes et al. | 425/503 |
| 5,614,146 A | * | 3/1997 | Nakamura et al. | 264/511 |
| 5,711,839 A | * | 1/1998 | Dronzek, Jr. | 156/277 |
| 5,885,408 A | * | 3/1999 | Kaminski | 156/567 |
| 5,908,590 A | * | 6/1999 | Yoshimi et al. | 264/45.4 |
| 5,919,414 A | * | 7/1999 | Dobler | 264/511 |
| 5,919,498 A | * | 7/1999 | Weber et al. | 425/503 |
| 5,943,957 A | * | 8/1999 | Mason | 101/483 |
| 5,980,233 A | * | 11/1999 | Oosaki | 425/503 |
| 6,183,238 B1 | * | 2/2001 | Dunlap et al. | 425/503 |
| 6,193,925 B1 | * | 2/2001 | Weber et al. | 264/509 |
| 6,264,876 B1 | * | 7/2001 | Ballay | 264/509 |
| 6,416,706 B1 | * | 7/2002 | Fisher et al. | 264/484 |
| 6,730,251 B1 | * | 5/2004 | Eschenfelder et al. | 264/153 |
| 6,858,283 B2 | * | 2/2005 | Nishizawa et al. | 428/137 |
| 2005/0127565 A1 | * | 6/2005 | Wilson et al. | 264/275 |

* cited by examiner

*Primary Examiner*—Essama Omgba
(74) *Attorney, Agent, or Firm*—Hoffmann & Baron, LLP

(57) ABSTRACT

A method for manufacturing labels (2) for placement in a mold, in particular in an injection mold, wherein a strip of film (4) is supplied and is placed, by at least a part of a first side thereof, on a supporting carrier (6), whereafter a retaining element (14) is applied to, in particular slightly pressed upon, the second side, remote from the carrier (6), of the part of the film web (4) supported by the carrier (6), wherein the part of the film web (4) enclosed between the carrier (6) and the retaining element (14) is cut loose, and wherein the enclosed part, to be referred to as label (2), is taken hold of by the retaining element (14) and is picked up from the carrier (6) therewith.

17 Claims, 9 Drawing Sheets

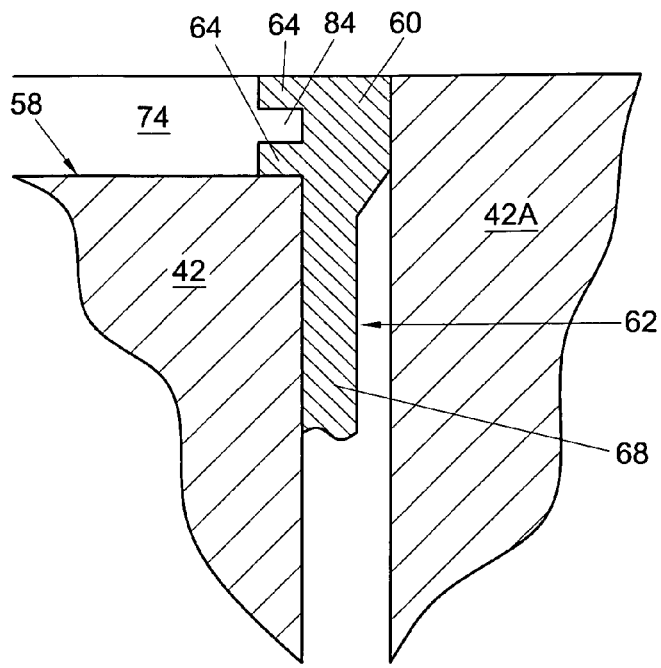
Fig. 9
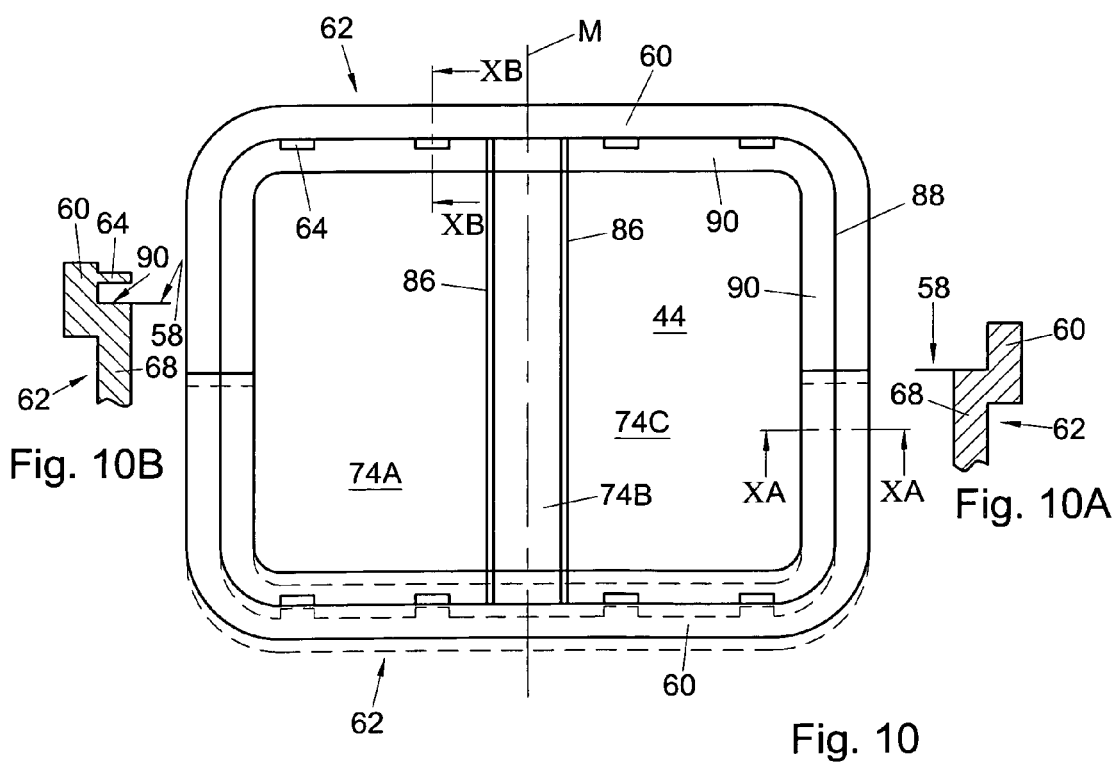
Fig. 10B
Fig. 10A
Fig. 10

METHOD AND APPARATUS FOR MANUFACTURING PRODUCTS AND PLACING LABELS IN A MOLD

This invention relates to a method for manufacturing labels for placement in a mold. Such a method is known from practice.

In this known method, labels are manufactured and loosely stacked onto each other, and by means of a transfer device the topmost label of a stack is picked up and transferred to a mold cavity, where the label is suitably placed. Thereafter, a plastic is sprayed against this label for forming a desired article. Such a method is usually designated by, for instance, in mold labeling. This known method has as a disadvantage that the labels are to be loosely manufactured and stacked, which requires that the labels be taken off the stack without this involving wrinkling, tearing, folding or other damage of the labels. Moreover, the conditions under which the labels are stacked, picked up and transferred into the mold must be controlled particularly well to obtain proper placement.

It has previously been proposed that labels, prior to placement, be cut or punched from a web of film, these labels be subsequently picked up by a transfer device and be placed in the mold cavity in a suitable manor. Such a method provides the advantage that the labels can be supplied in a particularly simple manner, viz., for instance, from a roll, and can be cut in situ, immediately prior to placement. Such a method, however, entails a disadvantage in that the labels, upon being cut or blanked, come to lie at least partly free, so that undesired changes in position may occur. Moreover, this known method still involves the disadvantage that prior to and during pickup and transfer of the label, the label may sustain damage, for instance by folding, wrinkling and the like. Further, the label, after being cut out or blanked, is to the picked up from the web of film before it can be transferred, which is time-consuming.

A further disadvantage of this known method is that the labels must have a relatively high dimensional stiffness, since in this known method, the labels are engaged only at a portion of their surface, such that the circumferential edges are free.

GB A 2 292 109 discloses an apparatus for cutting a number of labels simultaneously from a strip of a foil material, which cut out labels are transferred by the punches to a pressure pad with which the labels are transferred to a die. The labels are cut loose by the punches through a cutting die. During transfer of the labels these are carried loose on the punches.

The object of the present invention is to provide a method for manufacturing labels, which avoids the disadvantages of the method described, while maintaining the advantages thereof. To that end, a method according to the present invention is a method wherein a strip of film is supplied and at least a part of the side thereof is placed on a supporting carrier. A retaining element is then applied to and pressed against a second side remote from the carrier on the strip or film supported by the carrier. The film web is enclosed between the carrier and the retaining element and is cut loose to form a label and is taken hold of by the retaining element and picked up from the carrier.

By making use of a retaining element with which a part of the film web can be enclosed against the supporting carrier, which enclosed part is subsequently cut loose from the film web, the advantage is achieved that deformations, creases and the like can be simply prevented, even if no ideally sharp cutting means are utilized. By taking hold of the so cut and formed label with the retaining element and by subsequently picking up the label from the carrier with the retaining element, the necessity of having to take over the label is avoided, and so the label is held in the desired position at all times. This means there is no risk of the label intermediately becoming disengaged, for instance from the carrier, to possibly deform still by creasing, folding or the like. Preferably, the retaining means at the same time form transport means for displacing the cut-loose labels and optionally introducing them into a mold.

Accordingly, a method according to the invention provides the advantage that in a particularly fast and simple manner, particularly accurately, labels can be manufactured for placement in a mold, regardless of the thickness of the film from which the labels are cut.

In a preferred embodiment, a method according to the present invention wherein a retaining element is used which has an outer contour substantially corresponding to that of the desired label and the label forming part is cut loose along the outer contour.

The use of a retaining element having an outer contour substantially corresponding to that of the desired label provides the advantage that the label-forming part can be simply cut loose along the outer contour, so that particularly sharp cuts are obtained and damage of the label is prevented still better. Moreover, when the label is being picked up and transferred, the retaining element will still extend along the outer contour of the label and thereby protect it properly. This further simplifies particularly accurate placement of the label in a mold or transfer device.

The retaining element is preferably provided with vacuum means for holding the label, preferably such that the label is slightly stretched, at least pulled taut, on the retaining element, thereby simply preventing deformations of the label. Naturally, the label can be held in other ways as well, for instance through static charge, adhesion and the like, optionally in combination.

Preferably, the label-forming part is seized before being cut loose, in particular by means of at least the retaining element. The carrier, too, may be arranged for at least temporarily holding the label-forming part, for instance by vacuum means.

In further elaboration, a method according to the present invention wherein the label is transferred from the retaining element to an insertion device for placement of the label in a mold. The label is taken over by the insertion device in approximately in the same position.

With such a method, a label can be transferred to an insertion device with which the label can be placed in the mold, which insertion device can be, for instance, of a known kind.

In an alternative embodiment of the same inventive concept, a method according to the invention provides for manufacturing a label for placement in a mold in particular an injection mold. A strip of film is supplied and is placed with at a part of a first side thereof on a supporting carrier. The strip of film overlays a blank opening wherein a retaining element adjacent the strip is brought into the blank opening so that the part overlaying the blank opening is cut out by a blanking punch in the direction of the retaining element is taken hold of and is picked up for transfer to a mold. The part that is cut from the blank opening can be referred to as a label.

In such a method, the or each label is loosened from a web of film by blanking with a blanking punch and complementary blanking opening. Inasmuch as the label is pressed through the blanking opening, against the retaining element, the blanking forces are taken up by the blanking opening and not by the retaining element. As a consequence, the retaining element can still more easily form part of a robot, at least be placed on a movable arm.

In an advantageous embodiment, then, the retaining element, using a movable arm, is moved away, with the label, from the blanking opening and transferred to a mold, such that the label can be placed therein. This means that intermediate transfer of the label is not necessary. The time required for forming and placing the labels is thereby shortened considerably, so that the cycle time needed for forming labeled products is shortened considerably. The more so since, when in the advantageous embodiment described earlier, the blanking forces are taken up by the carrier, at least around the blanking opening, the retaining means and the means that carry the retaining means can be made of relatively light design and therefore can undergo high accelerations and decelerations. As a result, the retaining means can be displaced still faster.

The retaining means, in particular pickup means thereof, such as vacuum cups or the like, are preferably held against the film strip, in particular the or each label-forming part thereof, prior to the blanking of the label. It is then preferred that the label be already engaged by the retaining means before being blanked. As a result, the label can be held taut and in that position be transferred to the mold. The retaining means are then preferably of slightly resilient design or slightly resiliently suspended, so that the blanking movement can be simply followed, insofar as necessary, without unacceptably high pressure being exerted on the retaining means.

The invention further relates to a method for placing a label in a mold for in-mold labeling wherein each label to be placed is subsequently arranged in the mold against at least one wall portion and is secured against it and preferably through reduced pressure, adhesion or static charge.

With such a method, in a particularly accurate and fast manner, a label can be placed in a mold for in-mold labeling, so that cycle times for the manufacture of in-mold labeled products can be reduced, which is economically advantageous. Moreover, in such a method, particularly thin films can be used for the manufacture of the labels, which is material- and cost-saving. Moreover, this provides the advantage of yielding relatively little waste. Further, as a result, the product to be formed is substantially not influenced by the label.

A method according to the present invention is preferably used for labels having a thickness of less than 30 micrometers, more particularly a thickness of less than 20 micrometers, and preferably less than 15 micrometers. In a method according to the present invention, even films, at least labels, having a thickness of, for instance, 10 micrometers or less can be used. It will be clear that a lesser thickness of the film from which the labels are manufactured is advantageous in that less material is needed for them, and more labels, at least film, can be stored in a relatively limited space, while moreover the labels are lighter. A further advantage of such a method is that different techniques can be used for printing the film, such as planographic and engraving techniques, printing techniques and the like. This affords a particularly great freedom in designing the labels.

In such a method, in a cavity of an injection mold, a product is injection-molded, while at least a part of the product is determined by parts which are movable in an ejection direction, bounding and product-forming. During ejection of the product, these bounding parts are at least partly moved outside the cavity in question, while the parts in question continue to engage in an at least substantially form-closing manner and therefore continue to keep the product in the same position during at least a part of the ejection movement. Further, the or each bounding part contains engaging parts which are either enclosed in the ejection direction between two product parts or enclose a product part in the ejection direction in a form-closing manner, such that the engaging parts retain the product. Only when the product has been moved over a pre-selected distance in the ejection direction, wholly or partly outside the respective cavity, are the engaging parts moved relative to each other and/or the cavity, such that the product can come off the engaging parts and can be carried off. To that end, use can be made of gravity, but it is preferred that the product be engaged by a removal device before the whole has come off the engaging parts.

In a further advantageous embodiment, a method according to the invention wherein using the removal device at least one insert is placed in at least on the closing part of the mold preferably approximately simultaneously with the engagement of the product.

In such a method, approximately simultaneously with the engagement of a product with the aid of the removal device, an insert, for instance a core part, a label or the like is placed on the opposite side on, at least at, a closing part of the mold, such that upon closure of the mold the respective insert is moved into the opposite cavity and defines at least a part of the cavity. During injection molding, the respective insert is preferably fixedly incorporated into the product, such that it is ejected along with the product. Such a method provides the advantage that inserts can be rapidly placed during removal of the products, so that shorter cycle times can be obtained.

By providing engagement means that engage in openings or the like in the product, the advantage is achieved that in a finished product it is camouflaged still better where the ejection means have engaged. Moreover, this makes it possible in a particularly simple manner to enclose the respective product in a form-closing manner and to move it in a controlled manner, while moreover the engagement means can form desired undercuts without this necessitating additional slides, moving core parts or the like. As a result, a mold for use in such a method is simplified still further.

When in such a method the or each movable bounding part is further provided with means that engage the side of the product located at the rear in the ejection direction, in a simple manner a still more advantageous pressure distribution can be obtained in that a relatively large surface is available. In particular, such a rearward part can engage, for instance, along a complete longitudinal wall of the respective product. What is thus prevented still better is the occurrence of damage on the outside of the product as a result of the ejection means.

The invention further relates to an apparatus for manufacturing labels for placement in a mold in particular an injection mold having a supply means for a film web and a carrier means on which the film web can at least partially be supported and a cutting means for cutting loose, at least blanking out a label forming part of the film web. A retaining means can be provided which includes a pickup means for holding a label forming part of the film web to be referred to as a label. The retaining means can pick up the label loosely from the film web without deformation. The retaining means is arranged for locking the label-forming part against the carrier.

An apparatus according to the present invention provides the advantage that in a particularly simple and accurate manner, labels can be manufactured and can be transferred to a mold, while simply preventing any damage or other deformations of the labels. When the labels, during and after cutting, are continuously held by the retaining means in a position in which they are to be introduced into the mold, an apparatus according to the present invention provides the advantage that this apparatus can be used substantially independently of the ambient conditions. The labels cannot be influenced, for instance, by draught, undesired relative humidity, static or magnetic charge and the like, in that the retaining means prevent this. This provides the advantage that no special measures need to be taken in the surroundings of the apparatus, at least not in the surroundings of the transfer device.

In further elaboration, an apparatus according to the present invention wherein the blanking opening is formed by a first blanking plate, while the blanking punch is provided with a second complementary blanking punch. The blanking plates may be exchangeable with the other first and/or second blanking plates.

In such an embodiment, the or each label is cut out from a film web or film strip and during use in the blanking opening transferred to the retaining means, for placement in a mold such as an injection mold. To that end, the retaining means, in particular pickup means thereof, can be moved at least partly into the blanking opening, to a point close to or against the film strip, on the side remote from the blanking punch. What is thereby prevented as a result of the construction is that an undesirably high pressure is exerted on the retaining means during blanking. Moreover, damage to the or each label is prevented still better.

It is then preferred that the blanking opening and the blanking punch comprise a first and second blanking plate, respectively, or are formed by same, for instance a relatively thin metal plate, which is relatively simply exchangeable. To that end, the blanking plates can be secured to the carrier and the further punch, respectively, for instance with the aid of clamping plates, sliding means, screw means or the like. Such blanking plates, in case of wear, are easy to remove and replace by ground specimens, and the removed plates can be reground for reuse or can be discarded. Thus still less time is needed to keep the blanking means accurate, while the blanking means can moreover be simply adapted to a new form of label.

In further elaboration, an apparatus according to the present invention can include a retaining means arranged for directly placing the label in a mold.

The use of a blanking punch or cutting tool for cutting out the labels from the film provides the advantage that the labels can be cut loose in a single movement. As the label is locked between the carrier and the retaining means, the label is thus prevented in a simple manner from being damaged by the punch, for instance in that the punch has no optimum sharpness anymore.

In a further advantageous embodiment, an apparatus according to the invention wherein an insertion device is provided for taking over the label from the retaining means such that it can be transferred with the insertion device into an opened mold.

Direct placement of the labels in the mold with the aid of the retaining means provides the advantage that faster placement is possible, without intermediate transfer, so that shorter cycle times are enabled. In particular also when the blanking forces are substantially taken up by the blanking punch and the blanking opening, at least the cutting part thereof, and hence substantially not by the retaining means. Indeed, as a consequence, the retaining means and the operating means for movement thereof can be made of relatively light design, so that the movement forces that act on them are reduced. Partly as a consequence of that, moreover, higher accelerations and decelerations are possible, so that the cycle times can be shortened still further.

The invention further relates to an injection mold wherein the engaging part is arranged for engagement of or behind an undercut in the product.

By the use of at least one part at least partly bounding the respective cavity, that is, product-forming, which is movably arranged as ejector means, which movable part is provided with means with which the product formed in the cavity can be engaged, at least can be retained during an ejection movement, the advantage is achieved that the product, in a steered and controlled manner, can be moved out of the cavity and can be transferred to a removal device, or be released outside the respective cavity. As a result, at all times the position of the product can be accurately defined during ejection, while damage of the product can be simply prevented since a shaping part of the mold transmits the ejection pressure. In particular when use is made of a removal device with which the products to be taken out are to be transferred in a pre-selected position to further processing devices, a mold according to the invention is particularly advantageous because during the ejection no undesired positional changes will occur. This means that products can rapidly and uniformly be made ready for further processing, in principle without this requiring a check. The engaging parts here engage at least substantially remote from the rear side of the product, viewed in the ejection direction.

In a mold according to the invention, the movably arranged parts at least partly bounding the cavity during injection molding can contain undercuts and/or define undercuts in the product, such that the cavity is not, at least poorly, clearing. Indeed, inasmuch as the respective bounding parts are used as ejector means, they can move along out of the cavity and then release the product, for instance by moving the respective bounding parts apart relative to each other in a direction substantially at right angles to the ejection direction, or by loosening the product from the respective bounding parts by movement in a direction which includes an angle with the ejection direction. In the latter embodiment, the product can, for instance, be moved away at right angles to the ejection direction. Thus, with a relatively simple mold, the possibility is afforded of injection molding non-withdrawable, at least poorly withdrawable, products, so that a particularly great freedom of design is obtained.

In the use of such a mold for the manufacture of products labeled in-mold in the manner described earlier, the additional advantage is achieved that the label, at least the imprint, is not damaged during ejection.

The invention further relates to a product manufactured by injection molding, wherein the in-mold label has a thickness of less than 30 micrometers, in particular less than 20 micrometers, more particularly less than 15 micrometers, and preferably less than 10 micrometers.

Such a product provides the advantage that it has a pleasing appearance due to the label, while, for instance, product information, recognition means and the like have been formed integrally with the product, while further the properties of the labeled wall will substantially not be influenced by the label, since particularly thin labels have been used.

Further advantageous embodiments of a method and apparatus according to the invention are set forth in the dependent claims.

To clarify the invention, exemplary embodiments of an apparatus and method according to the invention will be further explained with reference to the drawings. In the drawings:

FIG. 1 schematically shows in sectional side elevation a label forming apparatus;

FIG. 2 schematically shows in sectional side elevation an opened mold during placement of a label;

FIG. 3 schematically shows in sectional side elevation the mold according to FIG. 2;

FIG. 4 shows in top plan view a film web with label for use in a method and apparatus according to the invention;

FIG. 5 schematically shows in perspective view retaining means according to the invention;

FIG. 6 schematically shows in sectional side elevation a portion of a mold according to the invention;

FIG. 9 shows in sectional side elevation a portion of an alternative embodiment of a mold according to the invention;

Figure 6:
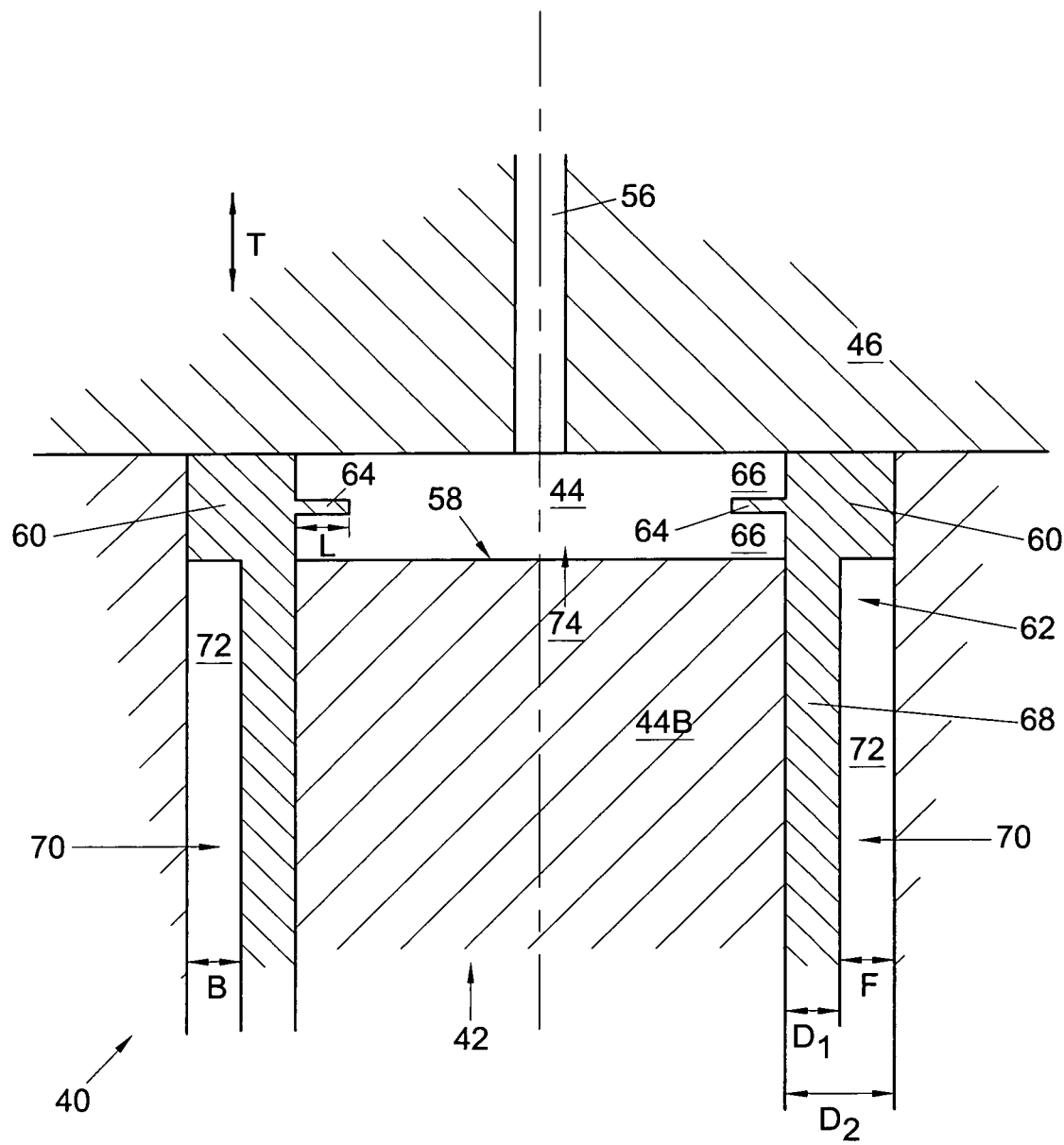
Figure 7:
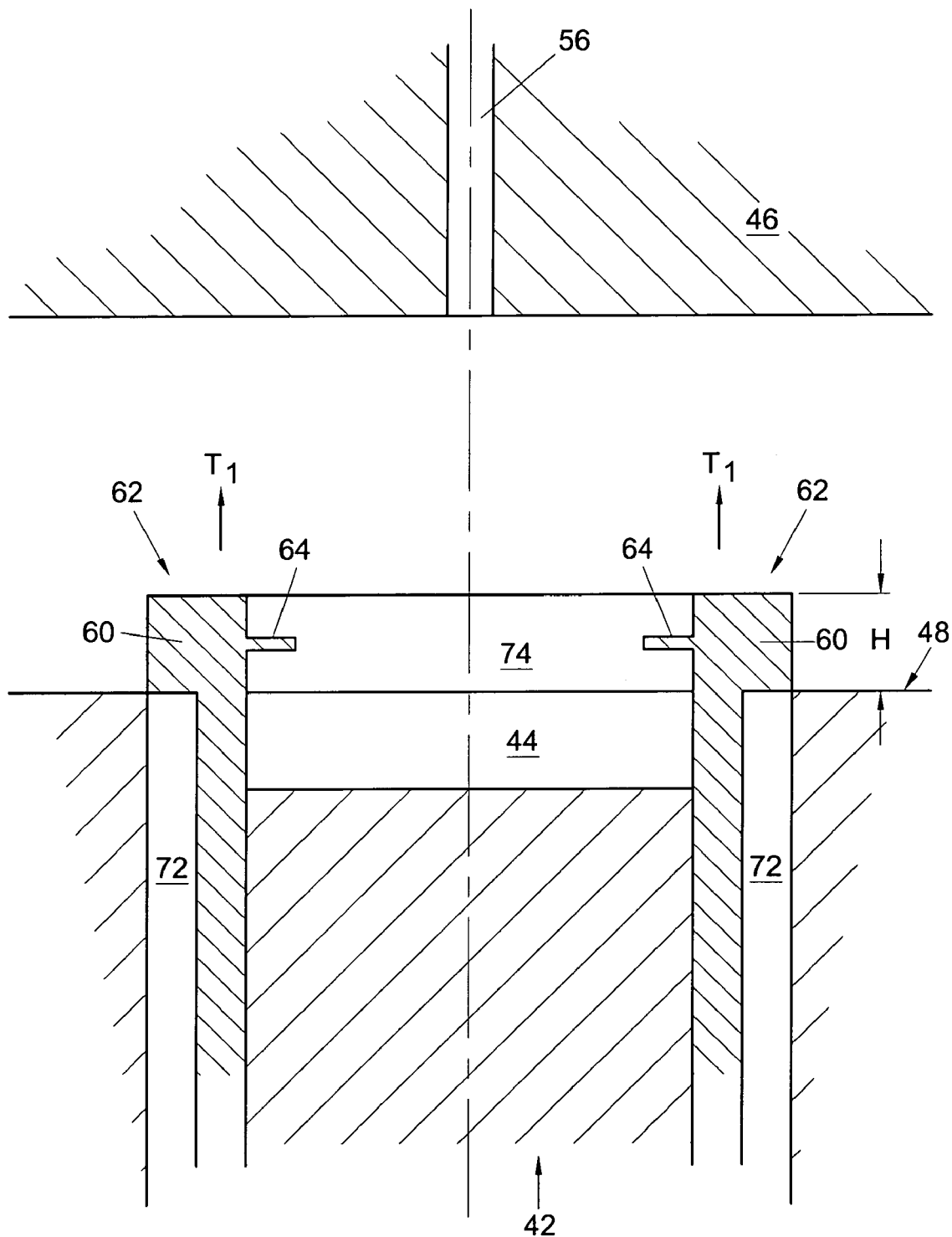
FIG. 7 shows the mold according to FIG. 6, in opened condition with partly ejected product.
Figure 8:
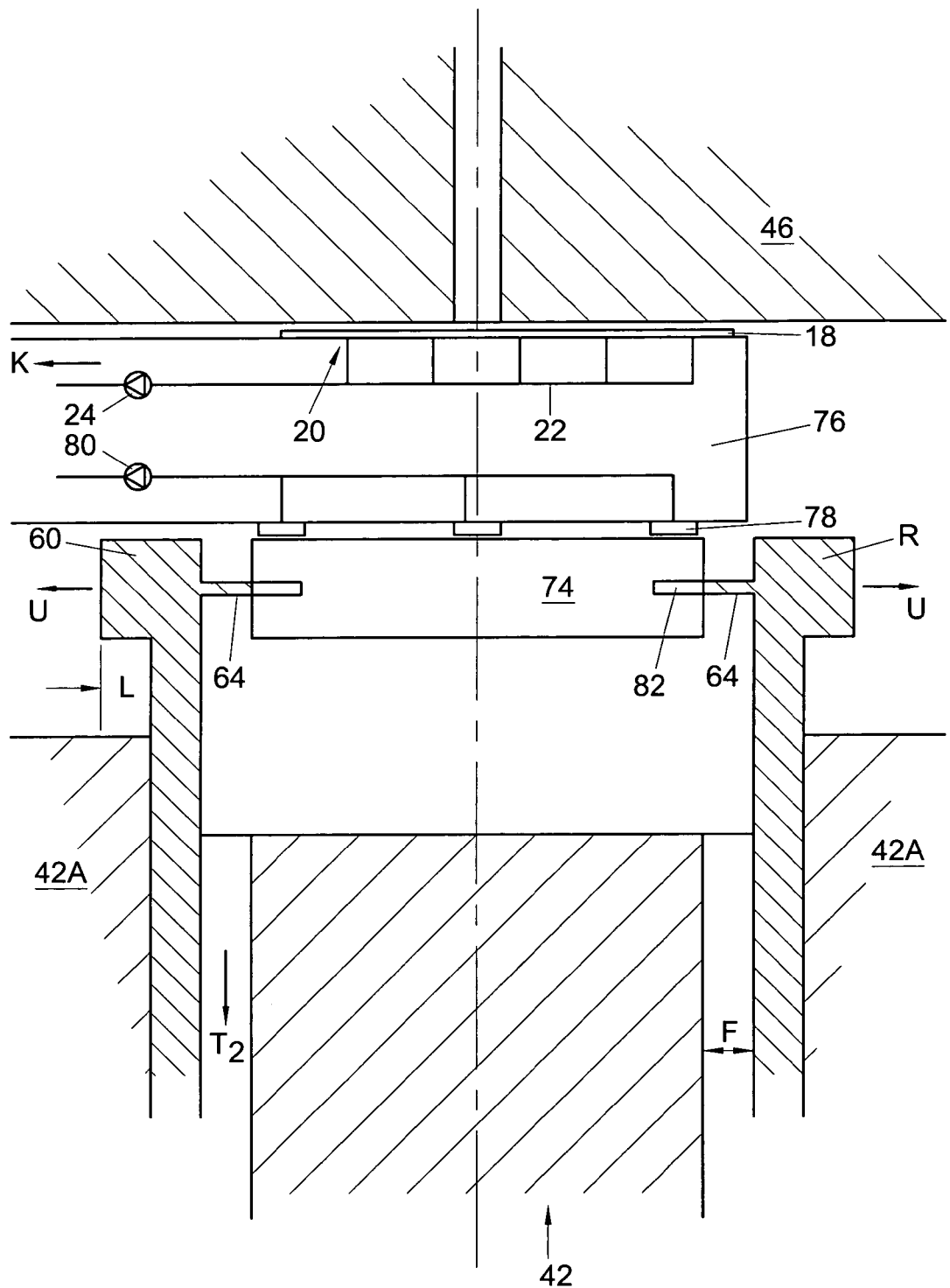
FIG. 8 shows the mold according to FIGS. 6 and 7 in opened position, with removal device.
Figure 11:
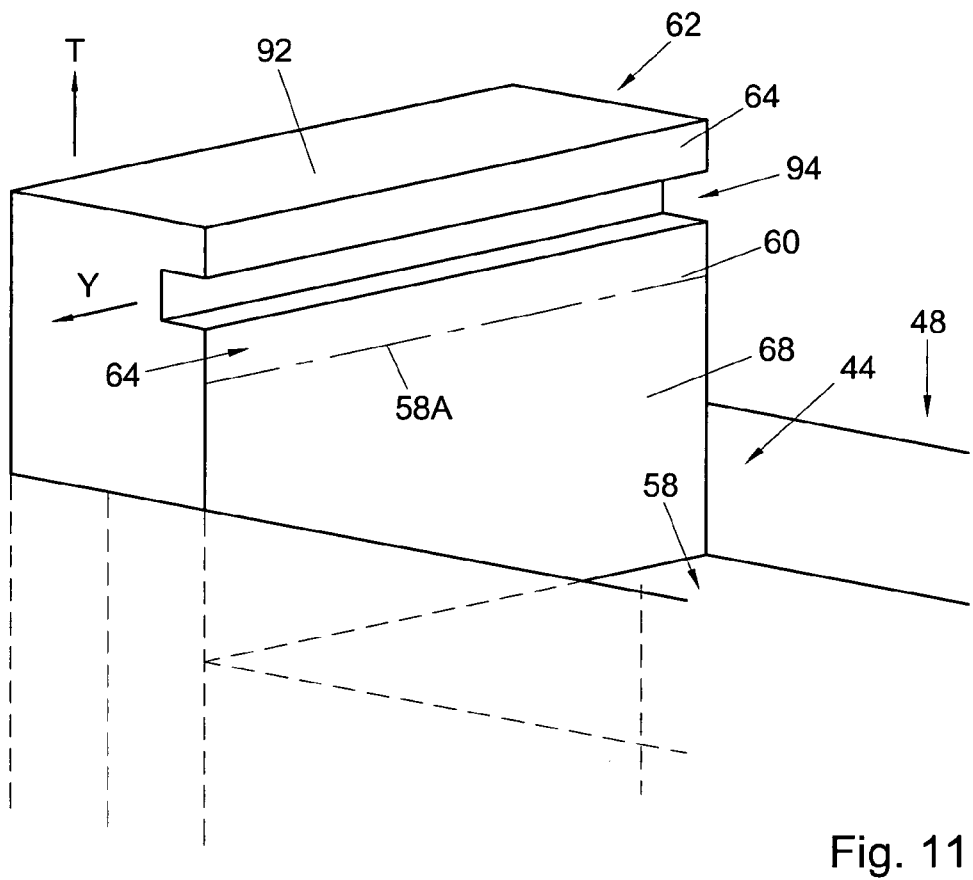
Figure 12:
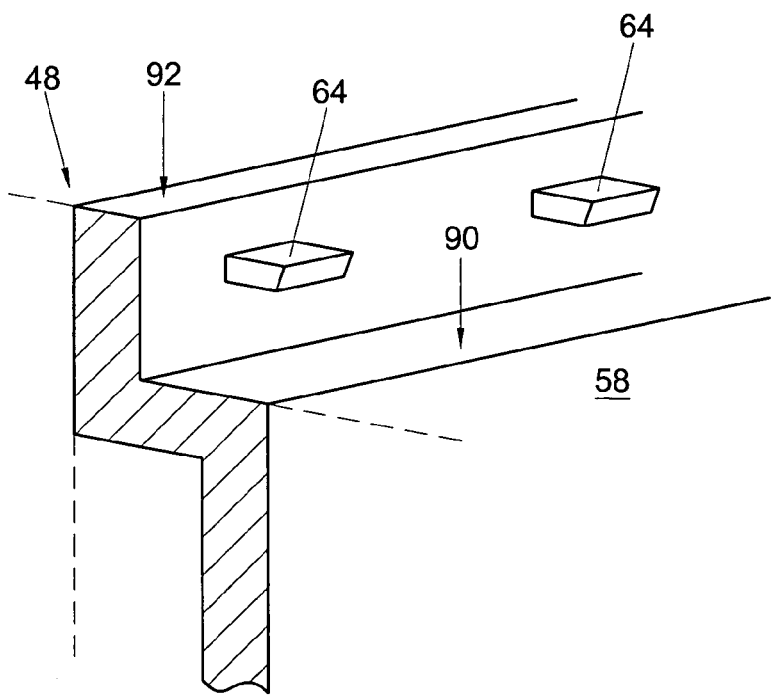
Figure 13:
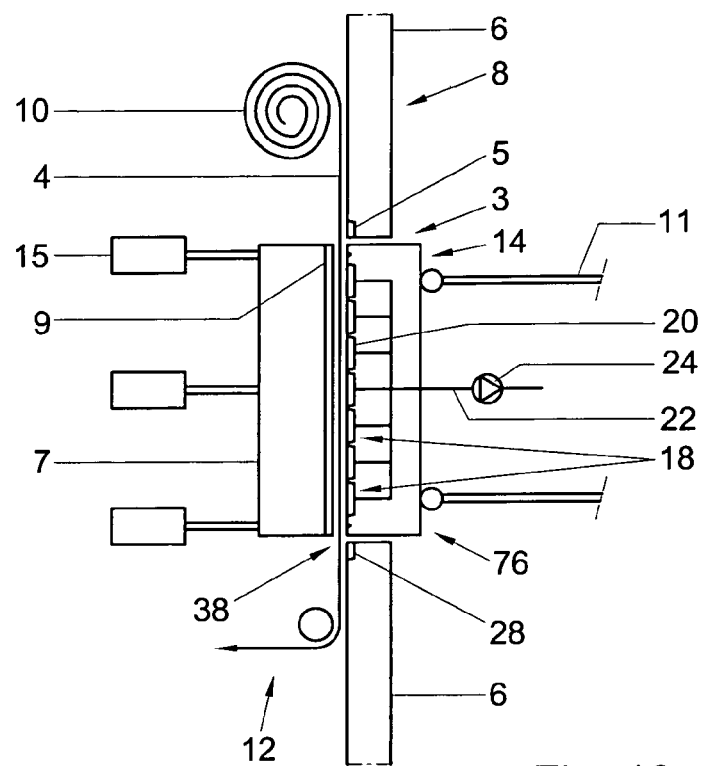
Figure 13A:
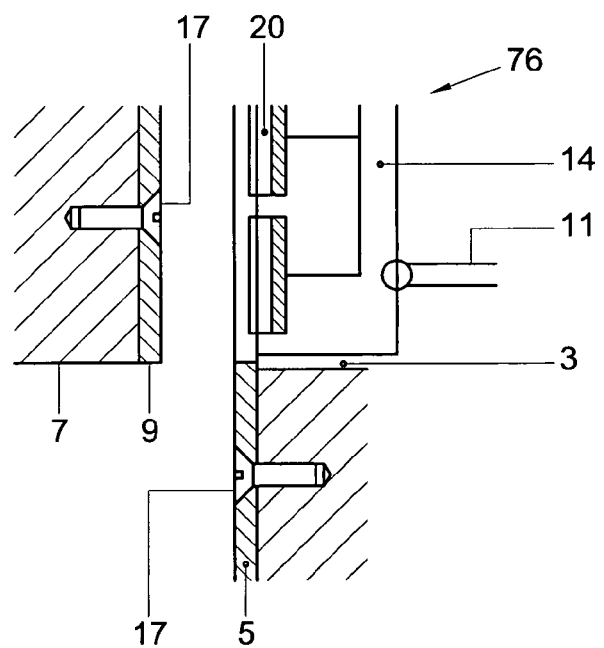

FIG. 10 schematically shows in top plan view a cavity with ejector means of a mold according to FIGS. 6–8;

FIGS. 10A and 10B show sections of a portion of a mold according to FIG. 10;

FIG. 11 shows a perspective view of a portion of a cavity with ejector means in a second alternative embodiment;

FIG. 12 shows a perspective view of a portion of a cavity with ejector means in a third alternative embodiment;

FIG. 13 shows in schematic partly sectional view an apparatus according to the invention, in an alternative embodiment; and FIG. 13A shows a portion of an apparatus according to FIG. 13, with punch and punch opening, on an enlarged scale.

In this description, the same or corresponding parts have the same or corresponding reference numerals.

Figure 1:
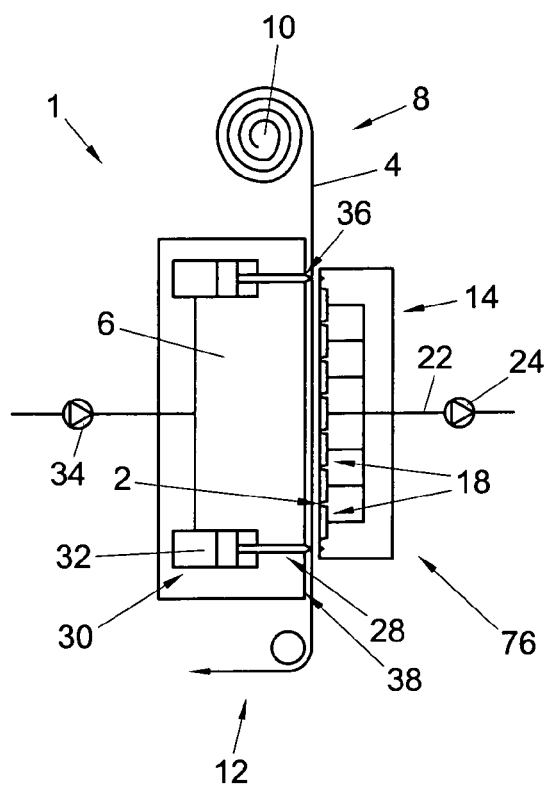
Figure 5:
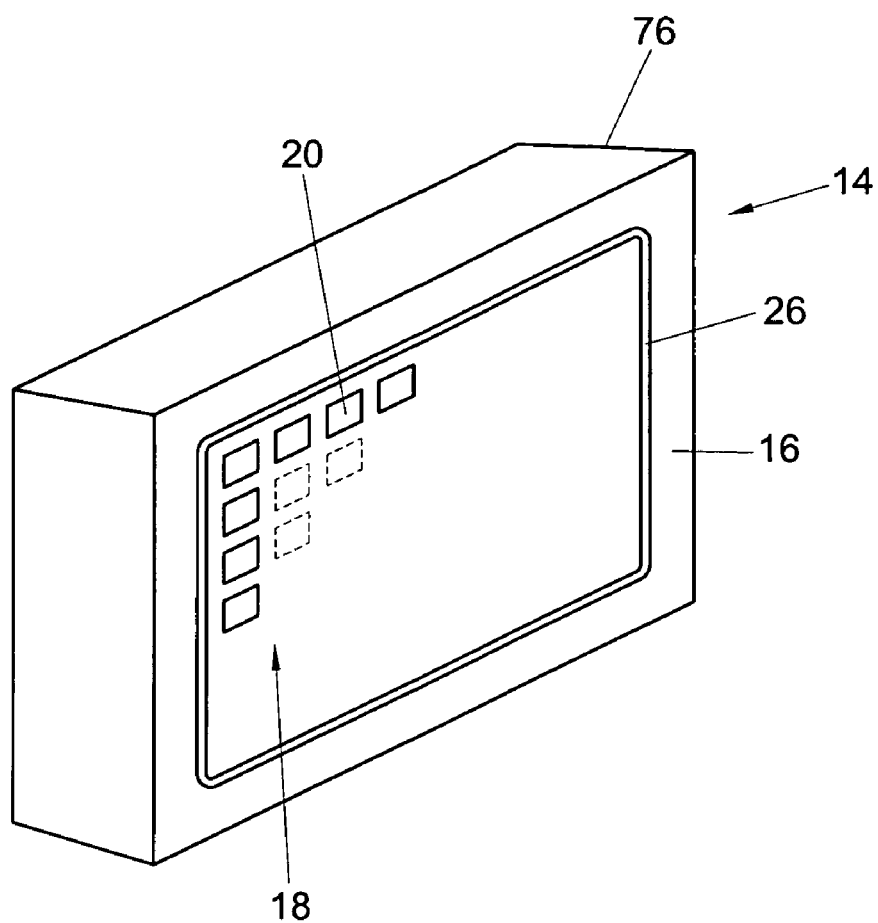

FIG. 1 shows a forming apparatus 1 for forming labels 2 from a film web 4. The forming apparatus 1 comprises carrier means 6, for instance a flat table over which a film web 4 can be supplied by supply means 8 from a roll of film 10. On the opposite side of the carrier means 6, the film web, at least the remainder thereof, can be discharged by film discharge means 12 suitable for the purpose. On the side of the film web 4 remote from the carrier means 6, retaining means 14 are placed, which are movably arranged, as will be described hereinafter in more detail. In FIG. 5 the retaining means 14 are shown in perspective view, from the closing side 16 which is proximal to the film web 4 during use. In the retaining means 14, pickup means 18 are provided, designed as vacuum means in the embodiment shown. These pickup means 18 comprise a number of vacuum cups 20 which are open on the side proximal to the pressure surface 16 and which are connected through a vacuum line 22 to a vacuum pump 24, schematically represented in FIG. 1. On the pressure surface 16, the outer contour 26 of a label 2 to be formed is indicated. The vacuum cups 20 are arranged at least along the inside edge of this outer contour 26, in a substantially continuous series. For that matter, vacuum cups 20 may also be provided on the rest of the surface within the outer contour 26, as is indicated in FIG. 5 by broken lines. It will be clear, for that matter, that other kinds of vacuum means can be provided, for instance in the form of a perforated plate, an air-permeable membrane or the like.

The outer contour 26 can be of planar extension in the pressure surface 16, but may also be designed in the form of a groove or bulge.

In the carrier means 6, cutting means 28 are included, which are movable by operating means 30, in particular cylinder/piston assemblies 32. By means of a pump 34, a pressure medium can be introduced into the piston/cylinder assemblies 32, enabling the cutting means 28 to be so moved as to have their cutting edge 36 extending above the surface of the carrier means 6. The cutting means 28 preferably have a shape identical to the outer contour 26 of the label 2.

A forming apparatus 1 according to the invention can be used as follows.

Figure 3:
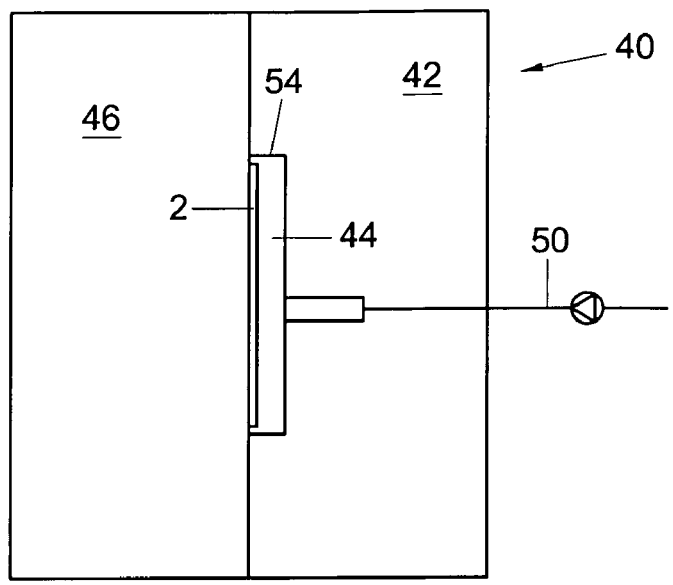
Figure 4:
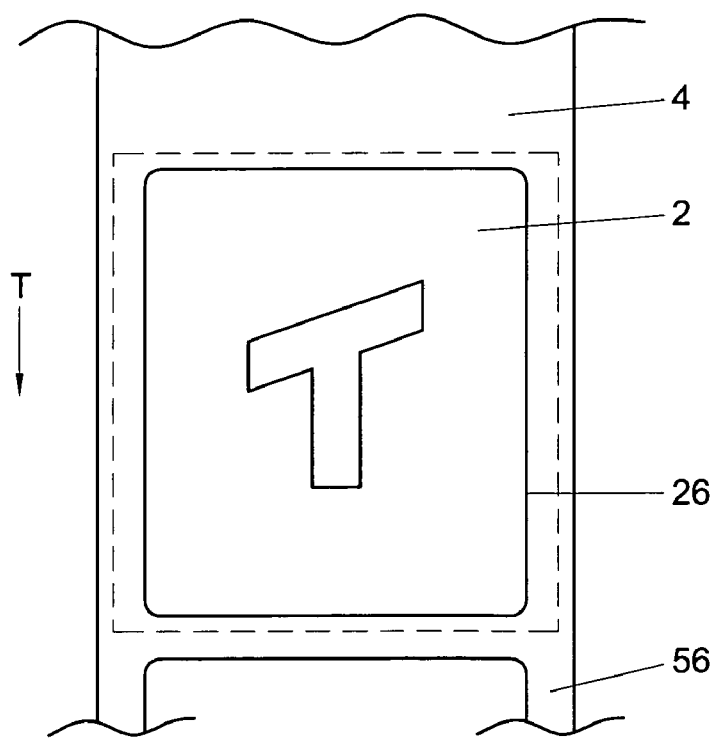

A film web 4 having preferably a small thickness, for instance less than 30 micrometers, is passed level over the surface of the carrier means 6, with the cutting means 28 retracted below said surface. Thereupon, the retaining means 14, through the pressure surface 16 thereof, are placed against the side of the film web 4 remote from the surface 38, while optionally the retaining means 14 can be pressed upon. Next, with the vacuum pump 24, a reduced pressure is built up in the vacuum cups 20, at least in the pickup means 18, such that the film enclosed between the carrier means 6 and the retaining means 14 is seized by the pickup means 18, at least along the inside circumference of the outer contour 26. Thereafter, using the operating means 30, the cutting means 28 are forced in the direction of the retaining means 14, such that the cutting edge 36 is pressed against the outer contour 26, thereby cutting the label 2 within the outer contour 26 loose from the film web 4. Thereupon, the retaining means 14 are moved away from the carrier means 6, with the label 2 being held in a planar position by the pickup means 18. Optionally, in the carrier means 6 and/or in the retaining means 14, vacuum cups 20 or other holding means may also be provided around the outer side of the outer contour 26 of the label 2, for retaining the residual material 56 during cutting (FIG. 4). Next, the label 2 can be transferred by the retaining means 14 to an injection mold 40 as shown in particular in FIGS. 2 and 3.

The injection mold 40 comprises a first closing part 42, in which a cavity 44 is provided, and a second closing part 46, provided with a smooth, level surface 48 on the side facing the first closing part 42. Supply means 50 for injecting plastic into the cavity 44 in the closed position of the mold link up with the cavity 44 at a suitable position and are known per se.

The retaining means 14 with the label 2 received thereon are moved between the moved-apart closing parts 42, 46 of the mold 40, with the label 2 facing the smooth surface 48 of the second closing part 46. Then the label 2 is pressed against the smooth surface 48, such that it will cling thereto, for instance through reduced pressure and/or static charge. As soon as the label 2 is sufficiently firmly connected with the surface 48, the vacuum means 22, 24 are controlled such that the pressure in the vacuum cups 20 rises, so that the label 2 is released by the pickup means 18. The retaining means 14 can then be moved away from between the mold parts 42, 46, while the label 2 continues to cling tightly to the second closing part. Then the mold 40 is closed, as shown in FIG. 3. Thereupon, plastic can be introduced into the cavity 44 by the supply means 50, against the side of the label 2 remote from the second closing part 46. This preferably gives rise to an at least partial fusion between the plastic and the label 2, such as to yield a strong inseparable bond between them. In the embodiment shown in FIG. 3, the label 2 lies somewhat clear of the walls 54 of the mold cavity 44. It is also possible, however, to design the mold 40 such that, for instance, a part of the circumferential edge of the label 2 is locked between the mold parts 42, 46. The label 2 may also be disposed, for instance, at a greater distance from the walls 54 of the mold cavity 44.

The film web 4 is preferably printed, prior to the formation of the labels 2. The film web can, for instance, be rolled up in printed condition to form the roll of film 10 and then be supplied therefrom. In the embodiment shown, for instance, the film web 4 is printed on the side facing the carrier means 6 during cutting. This means that in the mold the heated plastic is sprayed against the unprinted side of the label 2. It is also possible, however, to print the opposite side, while, further, both sides of the labels 2 can be made of printed design.

FIG. 4 shows in top plan view a film web 4 having therein a label 2, cut loose along the contour 26. In broken lines, the outer circumference of the retaining means 14 is drawn on the film web 4. As described above, it can be understood that the contour 26 corresponds to the cutting edge 36 of the cutting means 28. Shown in leading position, viewed in the direction of transport, is the residual material 56 of the film web 4 after the label 2 has been removed therefrom. In FIG. 4 a capital T is drawn by way of printing. It will be clear that any form of printing is possible here.

An apparatus and method according to the present invention provide in particular the advantage that very thin films can be used for forming labels. Thus, labels can be cut from film webs having, for instance, a thickness of 30, 20 or 15 micrometers. Even labels of a thickness of 10 micrometers or less can be cut. In fact, by means of the retaining means 14, in particular the pickup means 18, the film web 4 is kept taut when the labels 2 are being cut loose or blanked, so that damage to the labels is simply prevented. Thin labels have as an advantage that they require little material, that little waste is produced, that they occupy only little volume and have little influence on the end product, while yet a good printing and design are obtained. Moreover, such film webs allow of easy storage and transport.

FIG. 6 shows in sectional side elevation a portion of a mold 40 with cavity 44, in closed condition. The mold 40 comprises a first part 42 as base part and a second part 46 which functions as closing part. In the closing part 46 a supply channel 56 is arranged which terminates in the cavity 44, for instance via a hot runner (not shown), via which supply channel 56 plastic can be introduced into the cavity from an injection device (not shown). The first part 42 comprises, at least defines, the bottom 58 of the cavity 44; the closing part 46 the opposite side.

In the elevation shown in FIGS. 6–8, on opposite sides the cavity 44 is bounded by bounding parts 60 which will be further elucidated hereinafter and which form part of ejection means 62. From each bounding part 60 extend engaging parts 64, into the cavity 44, as partly shaping parts. In the embodiment shown in FIGS. 6–8, in the opening and closing direction T of the mold, which corresponds to the ejection direction, before and behind each engaging part 64, parts 66 of the cavity 44 are enclosed, for reasons to be specified hereinafter. Each bounding part is provided on, or forms the end of, an ejection rod 68 which extends through a space 70 in the first part 42. The ejection rod 68 has a width $D_1$ which is less than the width $D_2$ of the space 70. The ejection rod 68 abuts against the part 42B of the first part 42, enclosed between the ejection means 62, such that on the opposite side of the ejection rod 68 a slotted cavity 72 is left clear. This cavity 72 has a width F, corresponding to the difference between the widths $D_2$ and $D_1$ and is at least equal to the length L of each engaging part 64 over which it reaches into the cavity 44. By means of the ejection rod 68, each bounding part 60 can be moved in a direction T, as will be described hereinafter.

In the position of the mold shown in FIG. 6, plastic is introduced into the cavity 44 via the supply channel 56 and enabled to solidify at least to some extent in the cavity 44. Due to the engaging parts 64, the product 74 formed in the cavity 44 is non-withdrawable.

After the product 74 has solidified sufficiently, the closing part 46 is moved away from the first part 42, whereafter the ejection means 62 are moved in the ejection direction $T_1$ over at least a height H and preferably a height 2H, at least H plus the distance between the bottom 58 and the sides of the engaging parts 64 facing the bottom 58, such that the bounding parts 60 are moved above the closing face 48 of the first part 42. The product 74 is thereby carried along by the engaging parts 64 out of the cavity 44, such that the product 74 too extends, preferably completely, above the closing face 48. As appears from the foregoing, the product 74 is brought in a controlled manner from the position shown in FIG. 6 to the position shown in FIG. 7, retained by the engaging parts, so that the desired position can be readily maintained. The engaging parts 64 and the bounding parts 60 adjoin the side of the product 74 in a form-closing manner and can optionally be slightly pressed against it.

Thereafter, a removal device 76 is moved between the first part 42 and the second part 46 of the mold 40, as shown in FIG. 8, to a point beyond at least one of the bounding parts 60. The removal device 76 is provided, on the side facing the product 74, with first vacuum means 78, controllable through a first vacuum pump 80. The product 74 and/or the first vacuum means 78 are thereby controlled such that the vacuum means 78 contact the surface of the product 74 facing the vacuum means 78 and are activated, such that the product 74 is engaged by the first vacuum means 78. Thereafter the ejection means 62, at least the bounding parts 60 on opposite sides of the product 74, are moved apart over the distance F, such that the ejection rods 68 come to lie against the outer parts 42A of the first part 42 and the engaging parts 64 are moved out of the product 74. Undercuts 82 in the product 74 as formed by the engaging parts 64 are thereby cleared. Since the product 74 is retained by the first vacuum means 76, it will not fall back into the cavity 44. The bounding parts 60 are subsequently moved back slightly in the direction T2, for instance to a point close to the closing face 48, such that the product 74 can be pulled away by means of the removal device 76 in the direction K over the adjacent bounding part 60 from between the first part 42 and the closing part 46. Thereafter, the bounding parts 60 can be moved over the distance F again in the direction of the opposite bounding part, so that the ejection means 62 can be returned to the position as shown in FIG. 6. The mold 40 can then be closed again and be used for a next injection molding cycle.

In the embodiment shown, the removal device 76 is provided with second vacuum means 18 on the side located opposite the first vacuum means 78, which second vacuum means 18 are controllable by a second vacuum pump 24, with which inserts such as, for instance, labels 2 can be provided against the closing part 46. Upon closure of the mold 40, such an insert 2 will be brought into the cavity 44 and may then be incorporated into the product. If use is made of such inserts, it is preferred that the plastic can be introduced through an opening therein into the cavity 44, or that the supply channel 56 terminates remote therefrom and extends, for instance, through the first part 42 into the cavity 44. Such an embodiment will be immediately clear to one skilled in the art.

Using the removal device 76, the product 74 can be displaced outside the mold 40 and there be transferred to, for instance, other processing means. It will be clear, incidentally, that when the opening and closing direction T of the mold 40 is located in an approximately horizontal plane, at least a plane including an angle with the vertical, the product 74 can also be moved away from between the mold parts 42, 46 by gravity when it is released by the engaging parts 64 in the position shown in FIG. 8. In this way, too, a non-withdrawable product can be simply manufactured and product damage due to ejection means is prevented, at least camouflaged. Indeed, during manufacture, the engaging parts 64 fall into the undercuts 82 and will consequently not lead to an unpleasant appearance of the product 74. This is particularly advantageous especially when at least partly transparent products are manufactured.

FIG. 9 shows in a sectional side view a portion of an alternative embodiment of a mold 40, at least of ejection means 62, where in the bounding part 60 two engaging parts 64 are provided above each other in spaced relation, with an undercut 84 enclosed between them. In this embodiment too, during use, a product 74 can be retained by the ejection means 62 and be moved in a controlled manner out of the cavity 44, relative to the first part 42, in that at least a portion of the product is enclosed in a form-closed manner in the undercut 84. Again, the product 74 can be released by moving the different bounding parts 60 apart, such that the undercuts 84 of the product 74 are cleared.

FIG. 10 schematically shows, in top plan view, a cavity 44, for instance as shown in FIGS. 6–8, with ejection means 62. Shown in solid lines is the cavity 44, suitable for injection molding a product 74. In the lower half, in broken lines, it is schematically represented how a bounding part 60 in top plan view will move relative to the cavity 44, at least relative to an opposite bounding part 60.

The cavity 44 shown in FIG. 10 is suitable for manufacturing a product 74 with two injection molded hinges 86, so-called living hinges. The hinges 86 extend parallel to each other and parallel to the centerline M, throughout the full width of the cavity 44. Two bounding parts 60 substantially U-shaped in top plan view have been placed with the open side opposite each other and form the outer boundary 88 of the cavity 44. FIGS. 10A and 10B schematically show two cross sections of the bounding parts 60 with ejection rod 68, FIG. 10B clearly showing the engaging part 64. In this embodiment, the engaging parts 64 are formed by projections of minor height and width, which extend entirely above a supporting surface 90 of the respective bounding part 60. The supporting surface 90, when the mold is closed, is preferably flush with the bottom surface 58 of the cavity 44 and extends under the hinges 86 in a direction at right angles to the longitudinal direction thereof. The product parts 74A, 74B and 74C extending on opposite sides of the hinge lines 86 (and whose reference numerals are indicated in FIG. 10 in the parts of the cavity 44 where the respective product parts will be manufactured) are therefore supported by the supporting surfaces 90. Such a support provides the advantage that during displacement, in particular during ejection of a thus formed product, the possibility of pivoting of the different parts 74A–C about the hinge lines 86, and unintended disengagement of the product from the engaging parts 64, are simply prevented. This is advantageous in particular also when the hinge lines 86, unlike the embodiment shown in FIG. 10, extend at right angles to the centerline M, since in such an embodiment, upon pivoting of any one of the parts 74A–C, the respective part is pulled from the engaging parts 64.

FIG. 11 schematically shows in perspective view a cavity 44 with ejection means 62 which comprise a bounding part 60 of a cross section comparable to that shown in FIG. 9. However, in this embodiment, the ejection rod 68 is as wide as the bounding part 60. A chain-dotted line 58A indicates the line which is at the level of the bottom 58 of the cavity when the ejector means 62 are fully retracted. In that condition, the top surface 92 will be flush with the closing face 48. In the side of the bounding part 60 proximal to the cavity 44, an undercut in the form of a continuous slot 94 is provided, which is open adjacent the side of the bounding part 60. Above and under the slot 94, engaging parts 64 are provided. In this embodiment, a product can be removed from ejector means 62 provided on opposite sides of the cavity 44 by sliding the product through the slots 94 in the direction Y, at right angles to the ejection direction T.

FIG. 12 shows a portion of a mold according to FIG. 10 in perspective view, clearly showing the engaging parts 64 which extend above the supporting surface 90 flush with the bottom surface 58. Such a mold can be used, for instance, for manufacturing a package for a compact disc as described in international patent publication WO 97/20315. The engaging parts 64 then form slotted openings in the sidewalls of the package, so that comparable projections can be obtained on the inside of the wall, under which, for instance, a booklet or the like, belonging to the compact disc, can be clamped. Such projections in compact disc packages are known per se. In the manufacture of such a package by means of a method according to the invention, the advantage is achieved that no ejection damage is sustained as a result of the form-closing engagement with the aid of the engaging parts.

FIG. 13 schematically shows a portion of an apparatus according to the invention, in an embodiment in which blanking means are used. This figure shows a forming apparatus 1, for forming labels 2 from a film strip or film web 4. The forming apparatus 1 comprises a carrier 6, for instance a flat table over which the film web 4 is guided, for instance as described in FIG. 1. In the carrier 6, a blanking opening 3 is provided, formed by at least a first blanking plate 5 which is screwed onto the carrier 6 with screws 17. This is shown in more detail in FIG. 13A. Thus the first blanking plate 5 is rapidly exchangeable. On the side of the film web 4 remote from the blanking opening 3, a blanking punch 7 movable, for instance, with the aid of hydraulic cylinders 15, is arranged, having a second blanking plate 9, complementary in shape to the first blanking plate 5. The second blanking plate 9 is screwed against the punch 7, in order to be readily exchangeable, as appears more clearly from FIG. 13A. The first 5 and second blanking plate 9 are relatively thin and can be simply ground. The blanking opening 3 has the shape of the label 2 to be formed. It will be clear that by pressing the punch 7 with the second blanking plate 9 through the film web 4 into the blanking opening 3, the label is cut loose from the film web 4 and is moved into the blanking opening 3.

Figure 2:
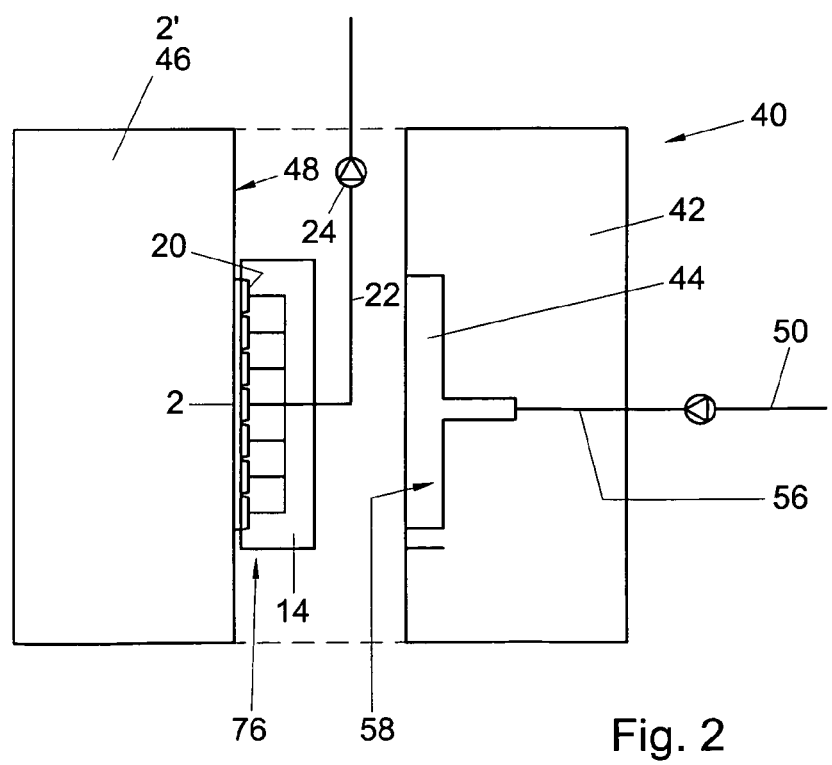

Into the blanking opening 3, a retaining means 14 has been moved by means of a robot arm 11, represented schematically and only in part. The retaining means 14 is generally comparable with a retaining means 14 as shown in, for instance, FIG. 1 and/or a transfer device 76 as shown in FIG. 8. By means of the robot arm 11, the retaining means 14 can be moved from the position shown in FIG. 13 to the position as shown in FIG. 2 or 8 (where the transfer device 76 is shown as such) and vice versa. The label 2, when it has been cut out with the blanking means 3, 5, 7, 9, is moved by the punch 7 against the retaining means 14 and seized by the pickup means 18. It is then preferred that the pickup means 18 seize the label-forming part before the label 2 is cut loose, thereby still better preventing the label 2 from deforming during displacement to the mold 30. To that end, the retaining means 14 are made of slightly springing design, either in that the vacuum cups 20 are of slightly elastic design (schematically represented in FIG. 13A through a hatching 20A behind the cups 20), or in that the retaining means 14 are flexibly connected with the arm 11, or a combination of the two. Other flexible solutions are also possible, of course. Due to this flexibility, the forces acting on the retaining means 14 are reduced still further. The punch 7 is, for instance, driven using hydraulic means 15 and performs a stroke that is relatively small, for instance a few millimeters to a few centimeters, sufficient on the one hand to move the film 4 between the first and second blanking plate 5, 9 and on the other to move the punch 7 through, at least into, the blanking opening 3. The flexibility mentioned therefore needs to be only small.

Around the punch 7 a retaining element (not shown) may be provided which can be moved along with the punch against the film web in order to fix the film web onto the carrier immediately prior to and during blanking or cutting of the labels. Thus, deformation of the labels is prevented still better. With an apparatus 1 according to the invention, particularly thin films can be cut or punched, for instance 15–30 μm or less. The retaining means 14 can naturally be provided again with means for engaging finished products, such as shown in and described with reference to FIG. 8. Of course, with cutting tools or blanking punchs of a different kind, in a comparable manner, an apparatus can be formed whereby the retaining means 14 can be moved into a cutting or blanking opening for picking up the label, without the retaining means being loaded by cutting or blanking forces. The first and second blanking plate 5, 9 determine substantially the shape of the labels to be formed. Therefore the apparatus can be simply adapted to differently shaped labels, by exchanging the blanking plates.

The invention is not limited in any way to the exemplary embodiments presented in the description and the drawings. Many variations thereof are possible within the framework of the invention outlined by the claims.

Thus, the retaining means 14 can be arranged for placing the label in the mold cavity, while the plastic is sprayed, for instance, from the opposite side, or is introduced into the mold cavity through the label. The or each mold cavity may be divided over several mold parts. Also, more than one label can be placed. Since use is made of the retaining means, it is also possible in a simple manner to cut irregularly shaped labels, while in them, for instance, openings may be provided as well. Also, through a suitable choice of the carrier means and correspondingly adapted retaining means, for instance of single- or double-curve design, a label can be cut which is, for instance, of single- or double-curve design, at least is to be placed on such a curved surface in a mold. This affords a particularly great freedom in design. Incidentally, also in the surface against which the label is to be placed in the mold, vacuum means or like holding means can be provided for holding the label, for instance when irregularities such as cavities or bulges are to be obtained in it. The vacuum cups can be so arranged that upon creating a reduced pressure therein, the label is slightly stretched, so that wrinkling or the like is prevented still better.

In the embodiment shown, the cutting means are included in the carrier means. It will be clear, however, that they can also be provided in the retaining means. Further, the retaining means can be shaped such that the cutting means can cooperate with the outer circumference thereof. Also, the cutting means can be fixedly arranged, with the label being cut loose by pressing the retaining means and the film web against the carrier means. The label 2 is preferably seized with the pickup means immediately prior to its being cut loose, but this can also take place during or directly upon its being cut loose. A mold according to the invention can be of both single and multiple design. In the embodiment shown, the label is directly transported with the retaining means to the mold and placed therein. It will be clear that the label can also be transferred intermediately to a different insertion device on which the label is fixed by comparable vacuum means or the like and subsequently placed in the mold.

With a method and apparatus according to the present invention, a variety of products can be formed. Thus, for instance, packages such as plastic boxes, containers, consumer products, vehicle parts, sheet parts and the like, can be provided with labels, at least printings, which printings are fixedly connected with the product in question. A method according to the present invention is generally applicable for labeling injection molded products. The retaining means are preferably so designed that they can also pick up pre-cut labels, for instance from a stack, and introduce them into the mold. Labels of various kinds and thicknesses can be used.

The mold and in particular the ejector means can be designed differently and can then be moved in a variety of ways. It is preferred that guideways are provided, in which the ejector means are guided along a pre-selected path using, for instance, cam elements or like guide elements, so that always the desired, controlled ejection movement is obtained. However, this controlled movement can also be provided for in a different way, variations which will be immediately clear to one skilled in the art. In the drawing, only one cavity is shown, incorporated in one of the parts of the mold. It will be clear, however, that in a comparable manner, molds can be formed in which the cavity is divided over different mold parts, while moreover a mold according to the invention can be designed as a multiple mold. Moreover, also in the mold according to the invention other moving parts, such as slides and the like, can be used. In the exemplary embodiments shown, the closing part of the mold is of flat design, but it will be clear that, for instance for forming box-shaped packages, mentioned earlier, the closing part may also be provided with a profiling. Also, on the bottom of the cavity in the first part the necessary profiling may be provided. Furthermore, the ejector means can also be wholly or partly provided in the closing part. The bounding parts can also be wholly or partly covered at the top by product parts and can also be pulled away in a direction including an angle with the ejection direction which deviates from 90°, for instance for forming inclined openings.

These and many variations are understood to fall within the scope of the invention outlined by the claims.

What is claimed is:
1. A method for manufacturing labels from a strip of film for placement in an injection mold comprising the steps of:
    placing a first side of a part of a strip of film on a supporting carrier;
    pressing a retaining element on a second side of said part of said strip of film remote from said carrier, said retaining element and said carrier enclosing said part of said strip of film therebetween;
    holding said part of said strip of film by said retaining element;

cutting said part of said strip of film enclosed between said carrier and said retaining element sufficiently to loosen said part of said strip of film from said strip of film to form a label-forming part; and removing said label-forming part from said carrier, wherein the label-forming part, prior to being cut loose, is taken hold of by the carrier.

2. A method for manufacturing labels from a strip of film for placement in an injection mold, the method comprising the steps of:

placing a first side of a part of a strip of film on a supporting carrier overlying a blanking opening, bringing a retaining element adjacent the strip of film into contact with the strip of film at least adjacent to, the blanking opening;

cutting said part of said strip of film overlying the blanking opening, to form a label, by a blanking punch, the label being held against the retaining element during cutting; moving said retaining element with the label held thereon from said blanking opening to a mold; and transferring said label directly from said retaining element into said mold.

3. A method according to claim 2, wherein during blanking the blanking forces are substantially taken up by the carrier, such that the retaining element is substantially not loaded.

4. A method according to claim 2, wherein on the carrier a first blanking plate surrounding or forming the blanking opening is secured, while on the blanking punch a complementary second blanking plate is secured.

5. A method for manufacturing labels from a strip of film for placement in an injection mold comprising the steps of:

placing a first side of a part of a strip of film on a supporting carrier;

pressing a retaining element on a second side of said part of said strip of film remote from said carrier, said retaining element and said carrier enclosing said part of said strip of film therebetween;

holding said part of said strip of film by said retaining element;

cutting said part of said strip of film enclosed between said carrier and said retaining element sufficiently to loosen said part of said strip of film from said strip of film to form a label-forming part; moving said retaining element with the label-forming part held thereon from a position where said part of said strip of film is cut to an injection mold, transferring said label-forming part directly from said retaining element into said injection mold.

6. A method according to claim 5, wherein a retaining element is used which has an outer contour substantially corresponding to that of a desired label, and the label-forming part is cut loose along the outer contour.

7. A method according to claim 5, wherein the enclosed, label-forming part is taken hold of using vacuum means provided in, at least on, the retaining element.

8. A method according to claim 7, wherein the label-forming part is taken hold of using at least vacuum means extending along the outer contour of the retaining element, such that the label-forming part is pulled taut, at least kept taut, over the retaining element.

9. A method according to claim 5, wherein the label-forming part is taken hold of using static charge of the retaining element and/or the label-forming part.

10. A method according to claim 5, wherein the label-forming part is taken hold of using adhesion between the label-forming part and the retaining element.

11. A method according to claim 5, wherein the label-forming part, prior to being cut loose, is taken hold of by the retaining element.

12. A method according to claim 5, wherein the strip of film is printed, prior to the formation of the labels.

13. A method according to claim 12, wherein the printing is provided on the second side of the strip of film.

14. A method according to claim 5, wherein the label-forming part, is stretched, at least on the retaining element, during or immediately prior to the label-forming part being taken hold of by the retaining element.

15. A method for placing a label in a mold for in-mold labeling injection molded products, wherein the or each label to be placed is manufactured with a method according to claim 5, and subsequently is arranged in the mold against at least one wall portion and is secured against it, preferably through reduced pressure, adhesion or static charge.

16. A method according to claim 5, wherein labels are manufactured from said strip of a film having a thickness of less than 30 micrometers.

17. A method according to claim 16, wherein labels are manufactured from said strip of a film having a thickness of less than 10 micrometer.

* * * * *